United States Patent
Cheng

(10) Patent No.: US 6,892,570 B2
(45) Date of Patent: May 17, 2005

(54) PRESSURE ALARM DEVICE

(76) Inventor: Win-Tai Cheng, No. 7, Chung-I one Street, Jen-Te Village, Tainan Hsien (TW)

( * ) Notice: Subject to any disclaimer, the term of this patent is extended or adjusted under 35 U.S.C. 154(b) by 104 days.

(21) Appl. No.: 10/606,742

(22) Filed: Jun. 27, 2003

(65) Prior Publication Data

US 2004/0263339 A1 Dec. 30, 2004

(51) Int. Cl.[7] .............................................. B60C 23/02
(52) U.S. Cl. ...................................... 73/146.8; 340/442
(58) Field of Search ............................... 73/146, 146.2, 73/146.3, 146.4, 146.5, 146.8, 706, 714, 756; 340/442–448; 152/415, 427, 429

(56) References Cited

U.S. PATENT DOCUMENTS 4,869,306 A * 9/1989 Keys ........................... 152/427
5,585,554 A * 12/1996 Handfield et al. ......... 73/146.5

* cited by examiner

*Primary Examiner*—William Oen
(74) *Attorney, Agent, or Firm*—Bacon & Thomas PLLC

(57) ABSTRACT

The present invention discloses a pressure alarm device comprising a first thread section defined in a connector of a connecting base for fixing an air nozzle of a tire by a screw, and a second thread section for fixing a valve nozzle by a screw; a flexible film disposed between said second thread section and said isolating base, and the film is fixed into a position by the valve nozzle; a conductive wire comprising an annular conductive ring with an upper surface and two conductor stands correspondingly disposed with an appropriate distance apart under the conductive ring.

27 Claims, 3 Drawing Sheets

PRESSURE ALARM DEVICE

BACKGROUND OF THE INVENTION

1. Field of the Invention

This invention relates to a pressure alarm device, more particularly to a pressure alarm device having a simpler structure for an easier and more convenient assembling.

2. Description of the Related Art

In general, tire pressure is always a major factor that affects the safety of driving. The U.S. Pat. No. 6,006,600 had made improvements over the U.S. Pat. No. 5,604,481 and provided a pressure alarm device that had the drawbacks of being cracked by flying pebbles when driving on a highway at high speed, unable to fall apart from the metal casing and assembled as easy as other pressure alarm devices. Such pressure alarm device has a connecting member integrally connects a metallic connecting base and a plastic sleeve base, and a nut is secured on the sleeve base. The connecting base is divided into two spaces by an isolating base, wherein an inner thread and a valve nozzle are disposed in one side of the space for installing the air nozzle of the tire by a screw, and a pressure switch is disposed on another side of the space in the same direction as that for jointly accommodating the sleeve base.

However, the U.S. Pat. No. 6,006,600 is still not a perfect design, because its components are very complicated and difficult for the assembling.

SUMMARY OF THE INVENTION

The objective of this invention is to provide an improved pressure alarm device, comprising a casing disposed on a connecting member and integrally formed by a conductive connecting base and a non-conductive sleeve, and the casing being secured onto the sleeve by screws; an emitting device and a power supply device being disposed in the interior space enclosed by the connecting member and the casing; a pressure switch including a first contact point and a movable base constituting a second contact point; an adjusting member having an elastic member disposed between the adjusting member and the movable base; a first circuit from a connecting point to the emitting device; and a second circuit connecting the second contact point to the emitting device; the connecting base further comprising a connector isolated by an isolating base having an operating hole and a conductive wire integrally formed with the connector; a first thread section formed in the connector being screwed onto the air nozzle of the tire and a second thread section being screwed to a valve nozzle; and a flexible film being disposed between the second thread section and the isolating base; conductive wire comprises an annular conductor ring, and a conductor stand; sleeve base comprises a tent section disposed at the wrapped connector and a base of the wrapped conductive wire, and said base being coupled to said casing by a screw; a fine-tune space and a sliding space being defined in the interior of said base; an inner thread being disposed in said fine-tune space for fixing said adjusting member by a screw; and a circumferential surface being disposed in the sliding space for letting a movable base slide.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
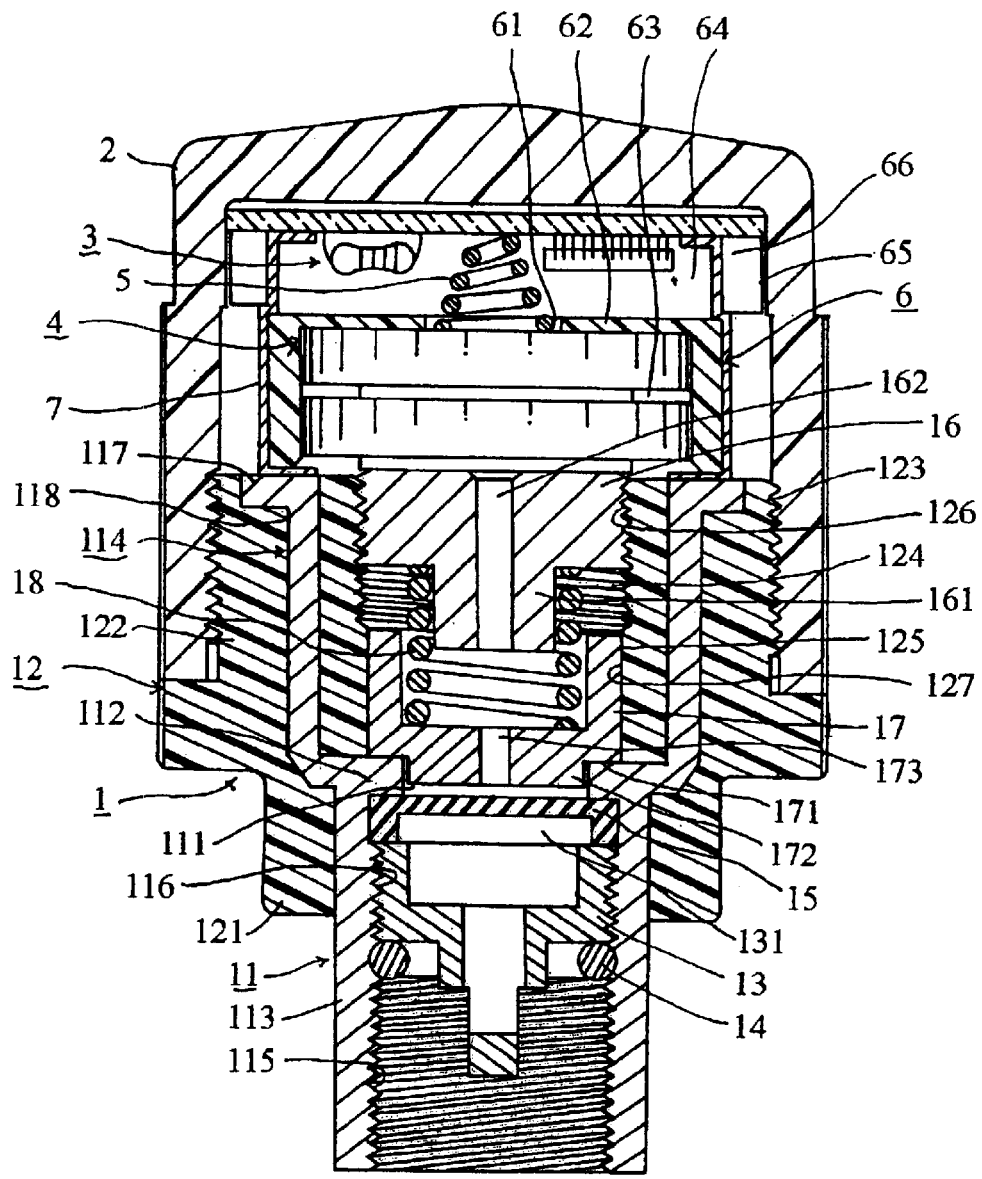
FIG. 1 is a cross-sectional diagram of the structure according to a preferred embodiment of the present invention.

Referring to FIG. 1, the pressure alarm device according to a preferred embodiment of the present invention comprises:

A connecting member 1, having a casing 2 installed by screws, an emitting device 3, a power supply device 4, and a conductive member 5 comprised of an elastic member inside the space enclosed by a connecting member 1 and a casing 2; the connecting member 1 being integrally formed by a conductive connecting base 11 and a non-conductive sleeve base 12, and the casing 2 being screwed on the sleeve base 12.

Figure 2:
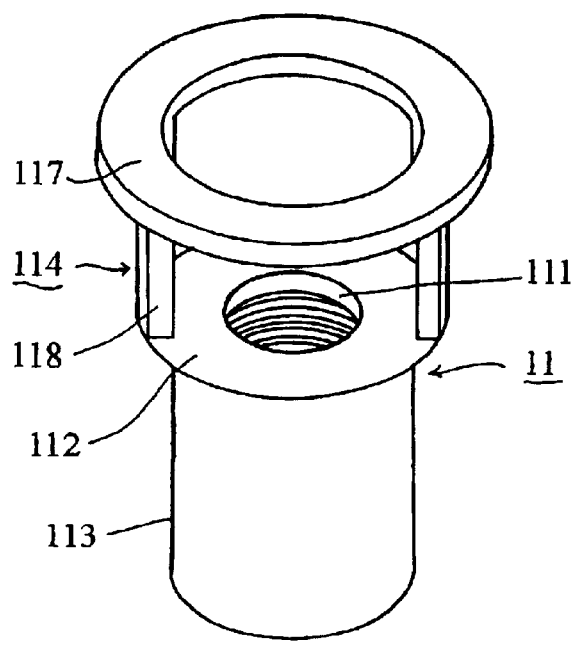
FIG. 2 is an illustrative diagram of the structure of the connecting base according to a preferred embodiment of the present invention

Referring to FIG. 2, the connecting base 11 made of a conductive material comprises a cylindrical connector 113 isolated by an isolating base having an operating hole 111 and a conductive wire 114 integrally formed with the connector 113; a first thread section 115 formed inside the connector 113 for installing the air nozzle of the tire by screws; a second thread section 116 formed for installing a valve nozzle 13 by screws; a sealing bushing 14 being disposed between them; a flexible film 15 secured by the valve nozzle 13 between the second thread section 116 and an isolating base 112 and an air chamber 131 being disposed between a film 15 and a valve nozzle 13; a conductive wire 114 comprising an annular conductive ring 117 with an upper surface and two conductor stands 118 correspondingly disposed with an appropriate distance apart under the conductive ring 117.

Referring to FIG. 1, the sleeve base comprises a tent section 121 at part of the periphery of the wrapped connector when it is formed, and a base 122 with part of the wrapped conductive body 114; wherein an outer thread 123 disposed outside the conductive wire 114 of the base 122 is sleeved by the casing 2, and a fine-tune space 124 and a sliding space 125 being formed in the interior on the other side of the conductive wire 114; an inner thread 126 for fixing an adjusting member 16 by screws being disposed in the fine-tune space 124 of the base 122; a circumferential surface 127 for vertically sliding a movable basin-shaped base 17 in the sliding space 125; an elastic member 18 of an axial base 161 protruded from the bottom of the adjusting member 16 connected to one end between the movable base 17 and the adjusting member 16; the movable base 17, adjusting member 16, and elastic member 18 being made of conductive material; a shoulder section 171 of the isolating base 112 disposed next to the periphery of the movable base 17; a guiding section 172 for sliding in the operating hole 111 being formed at the bottom of the center to keep an appropriate gap between the guiding section 172 and the film 15, and a ventilation hole 173, 162 respectively disposed on the movable base 17 and the adjusting member 16.

Figure 3:
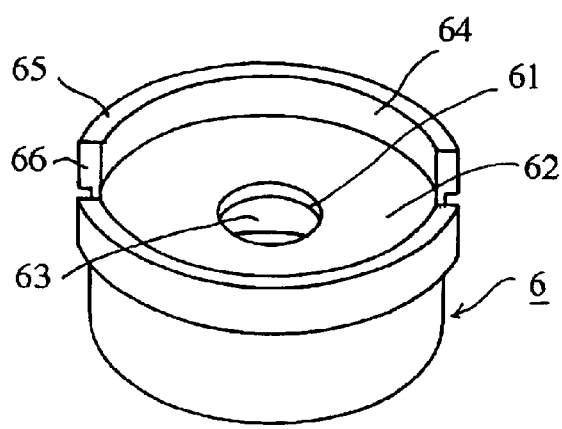
FIG. 3 is a cross-sectional diagram of the structure of a preferred embodiment of the present invention.

Referring to FIG. 3, the emitting device 3 and the power supply device 4 are disposed on a fixed base 6, and the fixed base 6 comprises an isolating member 62 having a penetrating hole 61 at the center, and the isolating member 62 isolates the fixed base 6 to form a first accommodating chamber 63 disposed at the lower section of the isolating member 62 for accommodating a power supply device 4, and a second accommodating chamber 64 disposed at the upper section of the isolating member 62; a circuit board 31 of the emitting device 3 being disposed on the upper edge of the circular frame 65, and the related electronic component 32 being accommodated in the second accommodating chamber 64; an opening 66, each being disposed on both sides of the circular frame 65 for allowing a conductive wire to pass through respectively; one end of the conductive wire 7 being connected to a circuit board 31, and the other end being bent along the outer side of the first accommodating chamber 63 and disposed at the lower section of the fixed base 6 to couple with the annular conductive ring 117 of the conductive wire 114.

Figure 4:
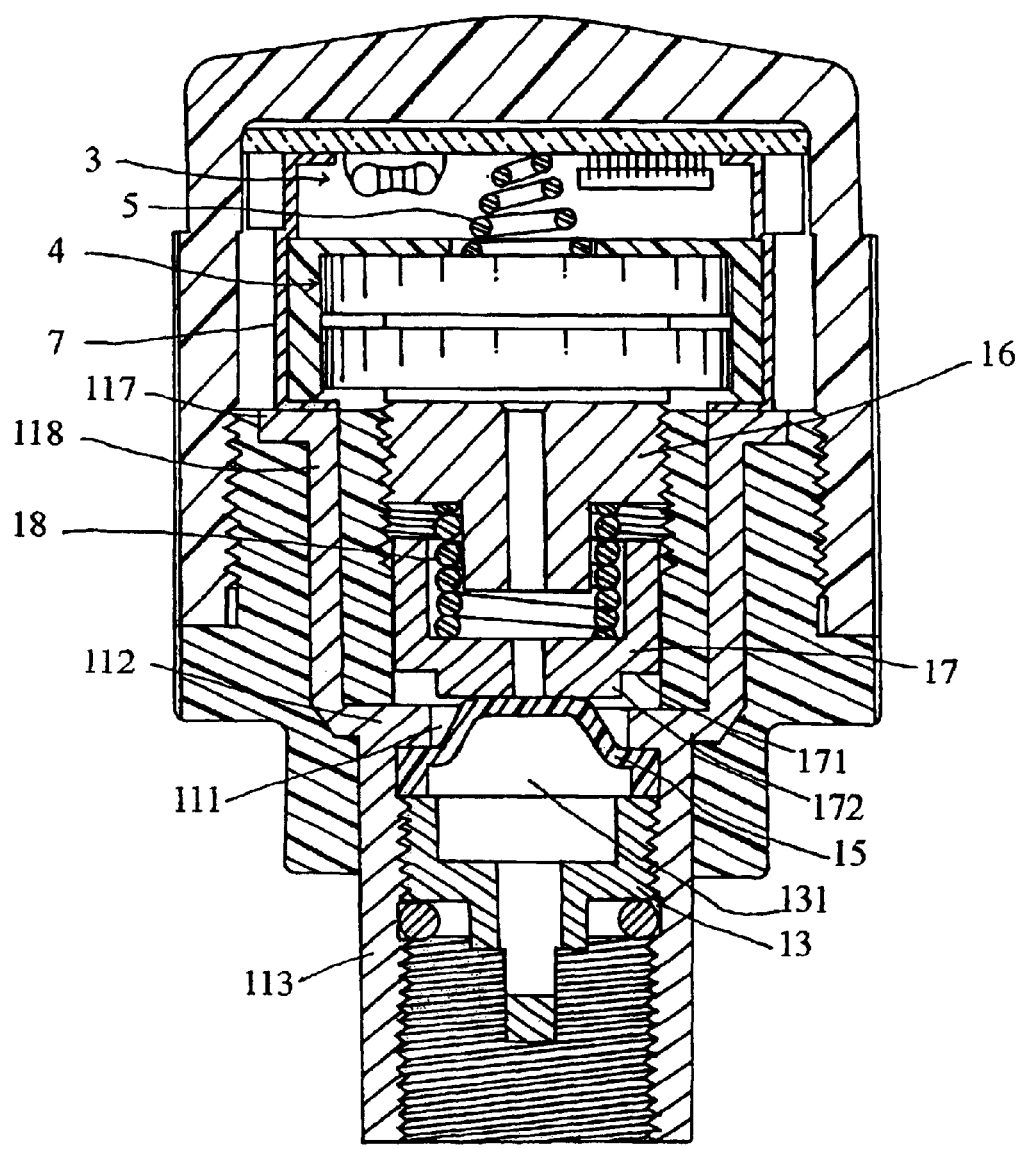
FIG. 4 is a cross-sectional diagram of the structure of the film propping the movable base according to a preferred embodiment of the present invention.

Referring to FIG. 4, a first circuit is formed from the conductor stand 11, conductor ring 117, and conductive wire 7 to the emitting device 3; a second circuit is formed between the transmission member 5, power supply device 4, adjusting member 16, and elastic component 18; a pressure switch 18 is formed by the movable base 17, isolating base 112, and film 15, wherein the isolating base 113 is the first contact point and the movable base 17 is the second contact point. Therefore, when the film 15 passes through a valve nozzle 13 in a connector 113 into an air chamber 131 and reacts with the gas inside, the film 15 flows to the top of an operating hole 111 in the guiding section 172 of the movable base 17. Once the air pressure in the air chamber 131 is higher than the set value of the elastic member 18, the film 15 will prop the guiding section 172, so that the shoulder section 171 of the movable base 17 is separated from the isolating base 112 to form a short circuit, and the emitting device 3 is unable to produce the signal emission function, which is also regarded as a normal state. On the other hand, when the air pressure in the air chamber 131 is lower than the set value of the elastic member 18 as shown in FIG. 1, the film 15 moves downward to move the guiding section 172 down, so that the shoulder section 171 of the movable base 17 is in contact with the isolating base 112 to produce a circuit, and lets the emission device 3 to produce the signal emission function.

Compared with the U.S. Pat. No. 6,006,600, the preferred embodiment of the present invention reduces the conductive circuit components such as the circular guiding base, conductive ring, and circular extension plate, etc. and also reduces the assembling components such as the hollow screw base and its fixed base. Therefore, the present invention can greatly reduce the complexity of the assembling and relatively lower the costs for the manufacturing, mold, and assembling, while enhancing the reliability of the test and assuring the quality of signal transmission.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A pressure alarm device, comprising:
   a casing, disposed on a connecting member, and being integrally formed by a conductive connecting base and a non-conductive sleeve base, and said casing being fixed onto the sleeve base by a screw; an emitting device and a power supply device being disposed in the interior space enclosed by a connecting member and said casing; a pressure switch including a first contact point and a movable base constituting a second contact point; an adjusting member having an elastic member disposed between the adjusting member and the movable base; a first circuit connecting a connecting point to the emitting device; and a second circuit connecting the second contact point to the emitting device; characterized in that said connecting base further comprising a connector isolated by an isolating base having an operating hole and a conductive wire integrally formed with the connector; a first thread section formed in the connector being fixed onto an air nozzle of the tire by a screw and a second thread section being fixed to a valve nozzle by a screw; and a flexible film being disposed between the second thread section and the isolating base.

2. The pressure alarm device as claimed in claim 1, further comprising a sealed bushing between said first and second thread sections.

3. The pressure alarm device as claimed in claim 1, wherein said conductive wire comprises an annular conductor ring, and a conductor stand disposed at an appropriate distance apart under said conductor ring.

4. The pressure alarm device as claimed in claim 1, wherein said sleeve base comprises a tent section disposed at the wrapped connector and a base of the wrapped conductive wire, and said base being coupled to said casing by a screw; a fine-tune space and a sliding space being defined in the interior of said base; an inner thread being disposed in said fine-tune space for fixing said adjusting member by a screw; and a circumferential surface being disposed in the sliding space for letting a movable base slide.

5. The pressure alarm device as claimed in claim 1, wherein said isolating base is the first contact point.

6. The pressure alarm device as claimed in claim 1, wherein said movable base at its periphery forms a shoulder section leaning on said isolating base, and at the bottom of its center has a guiding section in said operating hole.

7. The pressure alarm device as claimed in claim 1 further comprising a fixed base; an isolating member for isolating a first accommodating chamber for accommodating a power supply device and a second accommodating chamber for accommodating an emitting device.

8. The pressure alarm device as claimed in claim 1, wherein said fixed base at one side of the circular frame has an opening for passing the conductive wire, thereby one end of the conductive wire being coupled to a circuit board and the other end coupled to said conductive wire.

9. The pressure alarm device as claimed in claim 3, wherein said first circuit is comprised of a conductor stand, a conductor ring, and a conductive wire, and said second circuit is comprised of a transmission member, a power supply device, an adjusting member, and an elastic member.

10. A pressure alarm device, comprising:
    a casing, disposed on a connecting member, and being integrally formed by a conductive connecting base and a non-conductive sleeve base, and said casing being fixed onto the sleeve base by a screw; an emitting device and a power supply device being disposed in the interior space enclosed by a connecting member and said casing; a pressure switch including a first contact point and a movable base constituting a second contact point; an adjusting member having an elastic member disposed between the adjusting member and the movable base; a first circuit connecting a connecting point to the emitting device; and a second circuit connecting the second contact point to the emitting device; characterized in that said connecting base further comprising a connector isolated by an isolating base having an operating hole and a conductive wire integrally formed with the connector; conductive wire comprises an annular conductor ring, and a conductor stand disposed at an appropriate distance apart under said conductor ring.

11. The pressure alarm device as claimed in claim 10, further comprising a first thread section formed in the connector being fixed onto an air nozzle of the tire by a screw and a second thread section being fixed to a valve nozzle by a screw; and a flexible film being disposed between the second thread section and the isolating base.

12. The pressure alarm device as claimed in claim 10, further comprising a sealed bushing between said first and second thread sections.

13. The pressure alarm device as claimed in claim 10, wherein said sleeve base comprises a tent section disposed at the wrapped connector and a base of the wrapped conductive wire, and said base being coupled to said casing by a screw; a fine-tune space and a sliding space being defined in the interior of said base; an inner thread being disposed in said fine-tune space for fixing said adjusting member by a screw; and a circumferential surface being disposed in the sliding space for letting a movable base slide.

14. The pressure alarm device as claimed in claim 10, wherein said isolating base is the first contact point.

15. The pressure alarm device as claimed in claim 10, wherein said movable base at its periphery forms a shoulder section leaning on said isolating base, and at the bottom of its center has a guiding section in said operating hole.

16. The pressure alarm device as claimed in claim 10 further comprising a fixed base; an isolating member for isolating a first accommodating chamber for accommodating a power supply device and a second accommodating chamber for accommodating an emitting device.

17. The pressure alarm device as claimed in claim 16, wherein said fixed base at one side of the circular frame has an opening for passing the conductive wire, thereby one end of the conductive wire being coupled to a circuit board and the other end coupled to said conductive wire.

18. The pressure alarm device as claimed in claim 10, wherein said first circuit is comprised of a conductor stand, a conductor ring, and a conductive wire, and said second circuit is comprised of a transmission member, a power supply device, an adjusting member, and an elastic member.

19. A pressure alarm device, comprising:
a casing, disposed on a connecting member, and being integrally formed by a conductive connecting base and a non-conductive sleeve base, and said casing being fixed onto the sleeve base by a screw; an emitting device and a power supply device being disposed in the interior space enclosed by a connecting member and said casing; a pressure switch including a first contact point and a movable base constituting a second contact point; an adjusting member having an elastic member disposed between the adjusting member and the movable base; a first circuit connecting a connecting point to the emitting device; and a second circuit connecting the second contact point to the emitting device; characterized in that said connecting base further comprising a connector isolated by an isolating base having an operating hole and a conductive wire integrally formed with the connector; sleeve base comprises a tent section disposed at the wrapped connector and a base of the wrapped conductive wire, and said base being coupled to said casing by a screw; a fine-tune space and a sliding space being defined in the interior of said base; an inner thread being disposed in said fine-tune space for fixing said adjusting member by a screw; and a circumferential surface being disposed in the sliding space for letting a movable base slide.

20. The pressure alarm device as claimed in claim 19, further comprising a first thread section formed in the connector being fixed onto an air nozzle of the tire by a screw and a second thread section being fixed to a valve nozzle by a screw; and a flexible film being disposed between the second thread section and the isolating base.

21. The pressure alarm device as claimed in claim 19, further comprising a sealed bushing between said first and second thread sections.

22. The pressure alarm device as claimed in claim 19, wherein said conductive wire comprises an annular conductor ring, and a conductor stand disposed at an appropriate distance apart under said conductor ring.

23. The pressure alarm device as claimed in claim 19, wherein said isolating base is the first contact point.

24. The pressure alarm device as claimed in claim 19, wherein said movable base at its periphery forms a shoulder section leaning on said isolating base, and at the bottom of its center has a guiding section in said operating hole.

25. The pressure alarm device as claimed in claim 19 further comprising a fixed base; an isolating member for isolating a first accommodating chamber for accommodating a power supply device and a second accommodating chamber for accommodating an emitting device.

26. The pressure alarm device as claimed in claim 25, wherein said fixed base at one side of the circular frame has an opening for passing the conductive wire, thereby one end of the conductive wire being coupled to a circuit board and the other end coupled to said conductive wire.

27. The pressure alarm device as claimed in claim 22, wherein said first circuit is comprised of a conductor stand, a conductor ring, and a conductive wire, and said second circuit is comprised of a transmission member, a power supply device, an adjusting member, and an elastic member.

* * * * *